United States Patent
Guo et al.

(10) Patent No.: US 10,261,772 B2
(45) Date of Patent: Apr. 16, 2019

(54) METHOD AND DEVICE FOR GENERATING IMAGE FILE

(71) Applicant: BEIJING BAIDU NETCOM SCIENCE AND TECHNOLOGY CO., LTD., Beijing (CN)

(72) Inventors: Lijun Guo, Beijing (CN); Yu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/724,533

(22) Filed: Oct. 4, 2017

(65) Prior Publication Data

US 2018/0210720 A1 Jul. 26, 2018

(30) Foreign Application Priority Data

Jan. 25, 2017 (CN) .......................... 2017 1 0056556

(51) Int. Cl.
*G06F 8/61* (2018.01)

(52) U.S. Cl.
CPC ...................... *G06F 8/63* (2013.01)

(58) Field of Classification Search
None
See application file for complete search history.

(56) References Cited

U.S. PATENT DOCUMENTS

| | | | | |
|---|---|---|---|---|
| 2006/0026208 A1* | 2/2006 | Zhou | ......................... | G06F 8/63 |
| 2010/0011353 A1* | 1/2010 | Chalupa | .................... | G06F 8/61 |
| | | | | 717/177 |
| 2012/0246642 A1* | 9/2012 | Pafumi | ...................... | G06F 8/63 |
| | | | | 718/1 |
| 2012/0304167 A1* | 11/2012 | Robinson | .................. | G06F 8/63 |
| | | | | 717/177 |
| 2013/0132954 A1* | 5/2013 | Bolte | ........................ | G06F 8/63 |
| | | | | 718/1 |

FOREIGN PATENT DOCUMENTS

CN 103902347 A 7/2014

* cited by examiner

*Primary Examiner* — Philip Wang
(74) *Attorney, Agent, or Firm* — Lathrop Gage LLP (57) ABSTRACT

The present application discloses a method and device for generating an image file. A specific implementation mode of the method comprises: acquiring demand information for generating an image file, wherein the demand information comprises identification information of a to-be-imaged file and configuration information corresponding to the to-be-imaged file; acquiring an installation file of the to-be-imaged file according to the identification information; installing the installation file on a pre-created virtual host to generate the to-be-imaged file; selecting a custom file matching the configuration information from a pre-stored custom file set; and updating the to-be-imaged file based on the custom file matching the configuration information to generate the image file. The implementation mode realizes batch production of the image file.

12 Claims, 5 Drawing Sheets

METHOD AND DEVICE FOR GENERATING IMAGE FILE

CROSS-REFERENCE TO RELATED APPLICATION

This application is related to and claims the priority from Chinese Application No. 201710056556.6, filed on Jan. 25, 2017, entitled "Method and Device for Generating Image File," the entire disclosure of which is incorporated herein by reference.

TECHNICAL FIELD

The present application relates to the technical field of computers, specifically to the technical field of Internet, and more specifically to a method and device for generating an image file.

BACKGROUND

An image file is usually an independent file that is different from other files. It is made up of multiple files using recording software or image file making tools. With the development of network technology, providers can upload image files to cloud servers for users to use, thereby facilitating the use and transmission of the image files.

However, existing approaches of creating an image file often require a virtual host created by a human. An operating system is then installed and manually set on the virtual host, and the operating system is customized, such as installing security protection software or repairing software. After the virtual host is cleaned, the file (i.e., the image file) that stores the virtual host in a disk is provided to users. The whole creation process relies mostly on human participation.

SUMMARY

The objective of the present application is to provide an improved method and device for generating an image file, to solve the technical problems mentioned in the above background section.

In a first aspect, the present application provides a method for generating an image file, and the method comprises: acquiring demand information for generating an image file, wherein the demand information comprises identification information of a to-be-imaged file and configuration information corresponding to the to-be-imaged file; acquiring an installation file of the to-be-imaged file according to the identification information; installing the installation file on a pre-created virtual host to generate the to-be-imaged file; selecting a custom file matching the configuration information from a pre-stored custom file set, wherein the custom file contains data required to modify the content of the file; and updating the to-be-imaged file based on the custom file matching the configuration information to generate the image file.

In some embodiments, the updating the to-be-imaged file based on the custom file matching the configuration information to generate the image file comprises: copying the custom file matching the configuration information to the virtual host to generate an image custom file; updating the to-be-imaged file based on the image custom file to generate the image file; and clearing history record information on the virtual host.

In some embodiments, the method further comprises: testing the image file, and designating the image file as a target image file, if the testing is passed.

In some embodiments, the method further comprises: acquiring a modified custom file matching the configuration information if the testing is not passed; and updating the to-be-imaged file based on the modified custom file matching the configuration information to generate the image file.

In some embodiments, the updating the to-be-imaged file based on the modified custom file matching the configuration information to generate the image file comprises: updating the image custom file according to the modified custom file matching the configuration information; updating the to-be-imaged file based on the updated image custom file to generate the image file; and clearing history record information on the virtual host.

In some embodiments, the installation file comprises an installation package of the to-be-imaged file and a response file corresponding to the installation package, wherein the response file comprises setup parameters required to install the installation package.

In some embodiments, the installing the installation file on a pre-created virtual host to generate the to-be-imaged file comprises: installing the installation package on the pre-created virtual host based on the response file to generate the to-be-imaged file.

In some embodiments, the custom file comprises at least one of: a script program, a binary program, an installation file of application software, and an auxiliary file containing data required to install the application software.

In a second aspect, the present application provides a device for generating an image file, and the device comprises: a first acquiring unit, which is configured for acquiring demand information for generating an image file, wherein the demand information comprises identification information of a to-be-imaged file and configuration information corresponding to the to-be-imaged file; a second acquiring unit, which is configured for acquiring an installation file of the to-be-imaged file according to the identification information; an installing unit, which is configured for installing the installation file on a pre-created virtual host to generate the to-be-imaged file; a selecting unit, which is configured for selecting a custom file matching the configuration information from a pre-stored custom file set, wherein the custom file contains data required to modify the content of the file; and a generating unit, which is configured for updating the to-be-imaged file based on the custom file matching the configuration information to generate the image file.

In some embodiments, the device further comprises a testing unit, which is configured for testing the image file, and designating the image file as a target image file, if the testing is passed.

In some embodiments, the selecting unit is further configured for: acquiring a modified custom file matching the configuration information if the testing is not passed; and the generating unit is further configured for: updating the to-be-imaged file based on the modified custom file matching the configuration information to generate the image file.

In a third aspect, the present application provides a server, and the server comprises: one or more processors, and a storage device for storing one or more programs, wherein when the one or more programs are executed by the one or more processors, the method in the first aspect is implemented by the one or more processes.

In a fourth aspect, the present application provides a computer readable storage medium on which computer programs are stored, and the method in the first aspect is implemented when the computer programs are executed by the processors.

According to the method and device for generating the image file, provided by the present application, automatic installation of the to-be-imaged file is realized by acquiring demand information for generating an image file, acquiring an installation file of the to-be-imaged file according to identification information of the to-be-imaged file in the demand information, and installing the installation file on a pre-created virtual host. A matched custom file is then selected from a pre-stored custom file set according to configuration information in the demand information to update the to-be-imaged file on the virtual host, thereby generating the image file. Compared with the prior art, the present application implements automatic generation of the image file, which facilitates batch production of the image file. Meanwhile, the process of human participation is reduced, and the consistency of identical image files is favorably ensured.

BRIEF DESCRIPTION OF THE DRAWINGS

Other features, objectives and advantages of the present application will become more apparent by reading the detailed description of the non-restrictive embodiments made with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
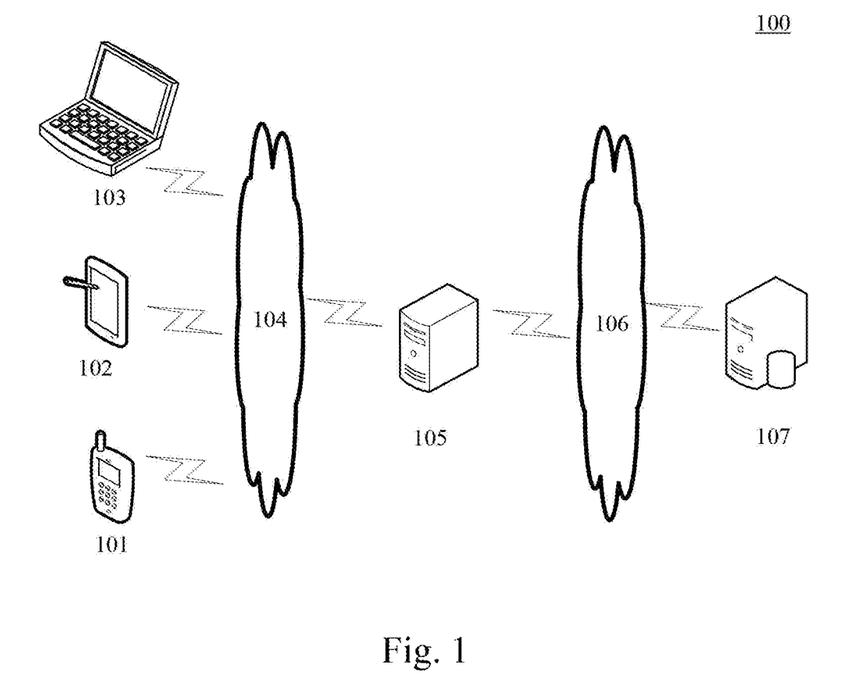
FIG. 1 is an exemplary system frame diagram to which the present application may be applied.

FIG. 1 shows an exemplary architecture of a system 100 which may be used by a method and apparatus for generating an image file according to an embodiment of the present application.

As shown in FIG. 1, the system architecture 100 may include terminal devices 101, 102 and 103, a networks 104 and 106, a server 105 and a database server 107. The network 106 serves as a medium providing a communication link between the server 105 and the database server 107. The networks 104 and 106 may include various types of connections, such as wired or wireless transmission links, or optical fibers.

The user may use the terminal devices 101, 102 and 103 to send required information to the server 105 through the network 104. Various communication client applications, such as web browser applications, downloading applications and instant messaging tools may be installed on the terminal devices 101, 102 and 103.

The terminal devices 101, 102 and 103 may be various electronic devices, including but not limited to, smart phones, tablet computers, e-book readers, laptop computers and desktop computers.

The database server 107 may be a server storing the installation file and/or the custom file set of the to-be-imaged file.

The server 105 may be a server for providing various services, for example, a background image file generating server for processing the acquired demand information for generating the mirror file sent by the terminal devices 101, 102, and 103. The background image file generating server may acquire installation files and matched custom files of relevant files from the database server 107, process these data, including analysis etc., and feed a processing result (e.g., a message prompting that the image file has been generated) back to the terminal devices.

It should be noted that the method for generating the image file, provided by the embodiments of the present application, is generally implemented by the server 105, and accordingly, the device for generating the image file is generally arranged in the server 105.

It should be appreciated that the numbers of the terminal devices, the networks, and the servers in FIG. 1 are only schematic. Depending on the implementation requirements, any number of the terminal devices, the networks and the servers may be provided. It should be noted that when the installation files and the custom file set of the relevant files are stored in the server 105, the database server 107 may not be arranged in the system architecture 100.

Figure 2:
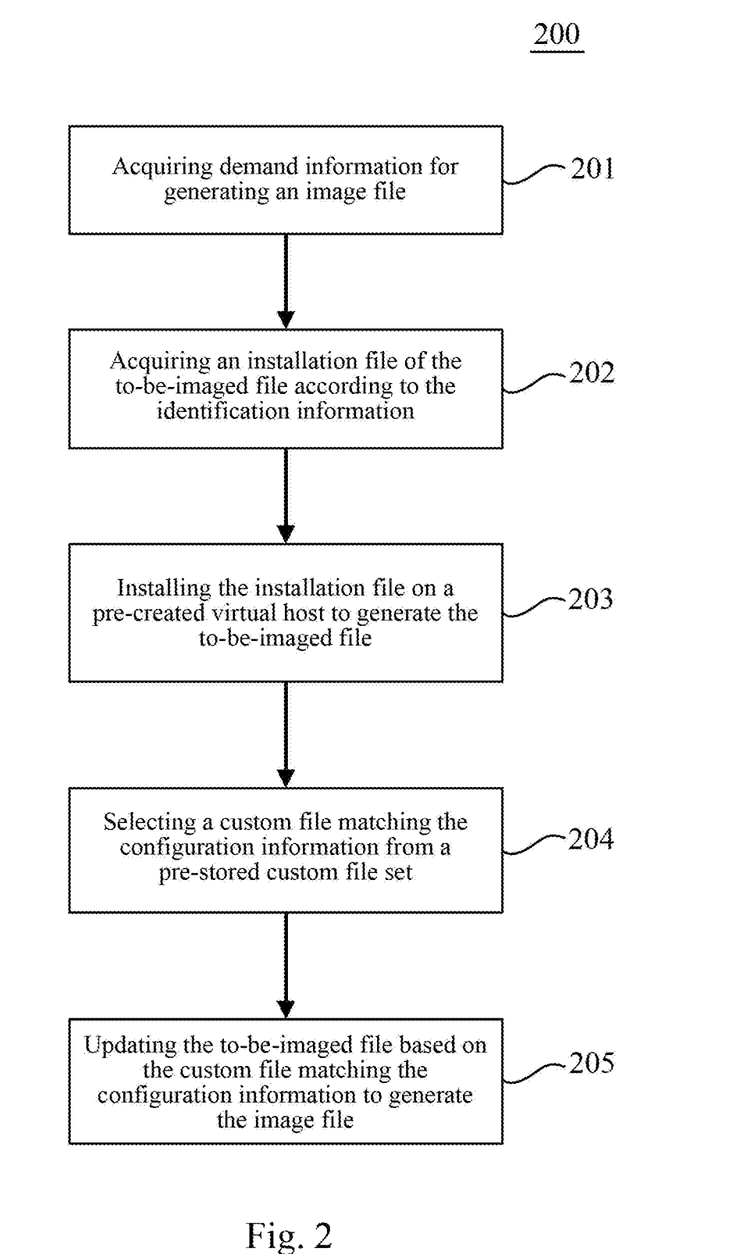
FIG. 2 is a flow diagram of one embodiment of the method for generating the image file according to the present application.

Continue to refer to FIG. 2, the process 200 of one embodiment of the method for generating the image file according to the present application is shown. The method comprises the following steps:

Step 201, acquiring demand information for generating an image file.

In the present embodiment, the electronic device (e.g., the server 105 shown in FIG. 1) on which the method for generating the image file is operated can acquire the demand information for generating the image file from a terminal used by a user in a wired or wireless connection mode. The demand information comprises identification information of the to-be-imaged file and configuration information corresponding to the to-be-imaged file.

In the present embodiment, the to-be-imaged file may be a variety of operating system files, for example: Centos (Community Enterprise Operating System) or Windows (windows computer operating system) etc. The to-be-imaged file may also be a variety of application software, such as instant messenger software, download software or video playback software, and the like. The image file may be a variety of files generated by the to-be-imaged file, such as an ISO file of a Windows 7 operating system. The format of the generated image file is not limited in the present application, and it can be .iso, .bin or .nrg, and the like.

In the present embodiment, the identification information may be a name and/or a version number of the to-be-imaged file, for example, Windows 7. It can also be a number, a character, a text, or any combination of the three. As an example, the identification information is 1, and the to-be-imaged file corresponding to 1 is a Windows 7 operating system. This correspondence may be preset by the user and stored in an electronic device. In addition, the configuration information may also be a number, a character, a text, or any combination of the three. For example, the configuration information is a client A, and a configuration requirement corresponding to the client A is security protection. Likewise, the correspondence may also be preset by the user and stored in an electronic device.

Step 202, acquiring an installation file of the to-be-imaged file according to the identification information.

In the present embodiment, based on the demand information acquired in the step 201, the electronic device (e.g., the server 105 shown in FIG. 1) may acquire identification information of the to-be-imaged file in the demand information. Then, according to the identification information, the installation file of the file can be obtained from the database server 107 shown in FIG. 1. Whether the installation file of the file is stored may be determined by local searching first. When the local searching fails, the installation file is acquired from the database server. It should be noted that the specific storage position of the installation file is not limited in the present application.

In some optional implementation modes of the present embodiment, the installation file may include an installation package of the to-be-imaged file, and a response file corresponding to the installation package. Wherein, the response file includes setup parameters required to install the installation package. For example: AutoUnattend.xml files for kickstart, preseed, and Windows. The kickstart is a question-answer file created for automated installation of operating systems such as Centos. The preseed is a question-answer file created for automatic installation of operating systems such as Debian (a free operating system).

Step 203, installing the installation file on a pre-created virtual host to generate the to-be-imaged file.

In the present embodiment, based on the installation file of the to-be-imaged file, acquired in the step 202, the electronic device (e.g., the server 105 shown in FIG. 1) can install the installation file in the pre-created virtual host to generate the to-be-imaged file.

In the present embodiment, the electronic device can select a response file matching the to-be-imaged file from the prestored response file set according to the name and/or the version number of the to-be-imaged file in the installation file. For example, the to-be-imaged file is a Centos operating system, and a response file Kickstart that is suitable for the Centos operating system is selected from the response file set. The installation file is then installed on the virtual host according to the data in the response file. It should be noted that the storage position of the response file set is equally not limited in the present application. The response file set can be stored locally or stored in the database server 107 shown in FIG. 1.

In the present embodiment, the virtual host may be created according to the prestored configuration file before the electronic device acquires the demand information. It may also be created according to the prestored configuration file after the electronic device acquires the demand information. The configuration file includes the data required to create the virtual host. In addition, an SSH (Secure Shell) service may be configured in the created virtual host to realize communication between the virtual hosts or between the electronic device and the virtual host. It should be noted that when the to-be-imaged file is an operating system, one to-be-imaged file may correspond to one virtual host. However, the present application does not limit the number of the to-be-imaged files and the to-be-imaged file can be set according to actual needs. In addition, the storage position of the configuration file and the position of the virtual host are not limited in the present application.

In some optional implementation modes of the present embodiment, when the installation file not only includes an installation package of the to-be-imaged file but also includes the response file corresponding to the installation package, the electronic equipment may directly install the installation package on the pre-created virtual host based on the response file to generate the to-be-imaged file.

Step 204, selecting a custom file matching the configuration information from a pre-stored custom file set.

In the present embodiment, based on the configuration information in the demand information obtained in the step 201, the electronic device may select a custom file matching the configuration information from the custom file set. The custom file includes data required to modify the content of the file. As an example, when the configuration information is about security protection, the custom file (e.g., antivirus software) related to security protection may be selected from the custom file set. As an example again, when the configuration information is about a client A, and a custom file named client A may be selected from the custom file set. It should be appreciated that the storage position of the custom file set is not limited.

In some optional implementation modes of the present embodiment, the custom file may include at least one of: a script program, a binary program, an installation file of application software, and an auxiliary file containing data required to install the application software.

Step 205, updating the to-be-imaged file based on the custom file matching the configuration information to generate the image file.

In the present embodiment, based on the custom file matching the configuration information selected in the step 204, the electronic equipment can update the content of the to-be-imaged file on the virtual host to generate the image file according to the data in the custom file. For example: the custom file contains network configuration data, and the electronic equipment can modify network configuration of the to-be-imaged file and use the modified to-be-imaged file as the image file according to the custom file.

According to the method provided by the embodiment of the present application, by using the identification information of the to-be-imaged file and configuration information associated with the file in the demand information, an installation file of this file and a matched custom file are acquired, so that this file is automatically installed and updated in the virtual host to generate the image file. The process of human participation is reduced, the batch production of the image file is realized and the consistency of the identical image files is favorably ensured.

In some optional implementation modes of the present embodiment, the step 205 may further be implemented through the following steps:

copying the custom file matching the configuration information to the virtual host to generate an image custom file;

updating the to-be-imaged file based on the image custom file to generate the image file; and clearing history record information on the virtual host.

Wherein, the history record information may include at least one of: history operation information, log file information, other residual configuration information, image custom files and the like. When the image file is an operating system, after the history record information on the virtual host is cleared, a brand-new operating system may be provided for a user to prevent the user from problems in the process of using the operating system (e.g., no network).

Figure 3:
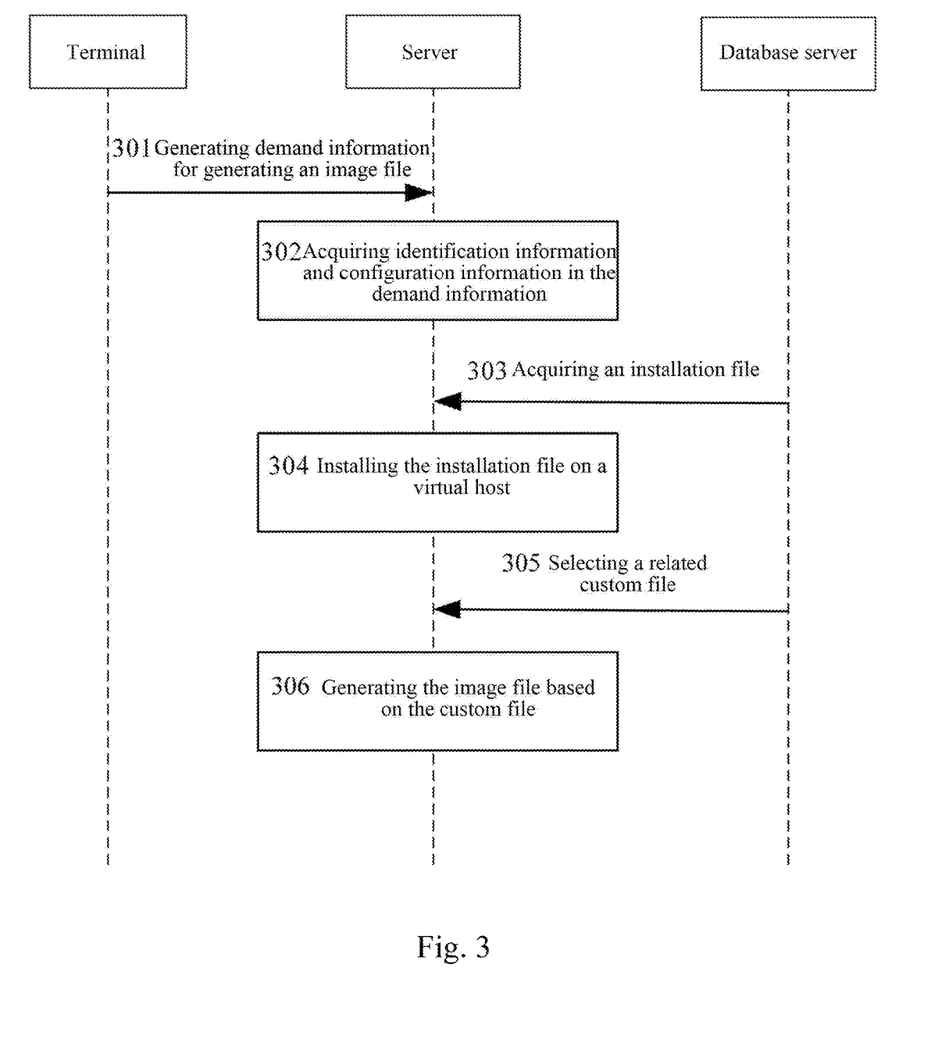
FIG. 3 is a schematic diagram of an application scenario of the method for generating the image file according to the present application.

Continue to refer to FIG. 3, and FIG. 3 shows a schematic diagram of an application scenario of the method for generating the image file according to the present embodiment.

In the application scenario shown in FIG. 3, the user firstly uses a terminal to send demand information (as shown by 301 in the Fig.) for generating an image file of a bug-fixed 32-bit Linux system; then, the server may use identification information (as shown by 301 in the Fig.) of the 32-bit Linux system in the acquired demand information to acquire an installation file (as shown by 303 in the Fig.) of the 32-bit Linux system from a database server; then, the server installs the installation file (as shown by 304 in the Fig.) in a pre-created virtual host; then, the server uses bug-fixing configuration information (as shown by 302 in the Fig.) in the acquired demand information to select a custom file (as shown by 305 in the Fig.) associated with bug fixing from a custom file set stored in a database server; and finally, the server fixes bugs of the 32-bit Linux system on the virtual host based on the custom file to generate an image file (as shown by 306 in the Fig.) of the bug-fixed 32-bit Linux system.

According to the method provided by the embodiment of the present application, by using the identification information of the to-be-imaged file and configuration information associated with the file in the demand information, an installation file of this file and a matched custom file are acquired, so that this file is automatically installed and updated in the virtual host to generate the image file. The process of human participation is reduced, the batch production of the image file is realized and the consistency of the identical image files is favorably ensured.

Figure 4:
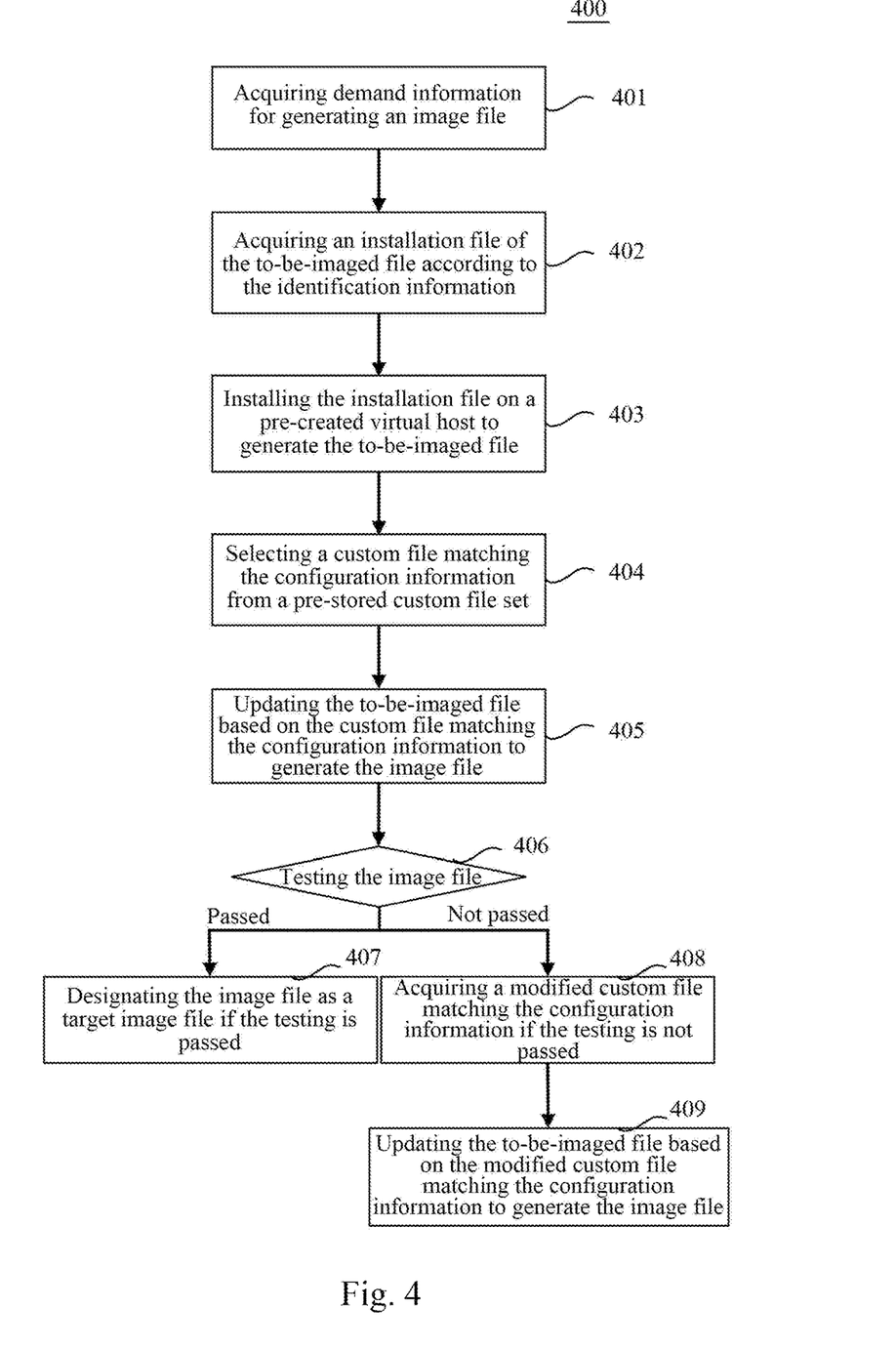
FIG. 4 is a flow diagram of another embodiment of the method for generating the image file according to the present application.

Further refer to FIG. 4 showing a process 400 of another embodiment of the method for generating the image file, the process 400 of the method comprises the following steps:

Step 401, acquiring demand information for generating an image file.

In the present embodiment, the electronic equipment (e.g., the server 105 shown in FIG. 1) on which the method for generating the image file is operated can acquire the demand information for generating the image file from a terminal used by a user in a wired or wireless connection mode. The demand information comprises identification information of the to-be-imaged file and configuration information corresponding to the to-be-imaged file.

Step 402, acquiring an installation file of the to-be-imaged file according to the identification information.

In the present embodiment, the electronic device may acquire an installation file of the file based on the identification information of the to-be-imaged file. Refer to the step 202 shown in FIG. 2 for more details.

Step 403, installing the installation file on a pre-created virtual host to generate the to-be-imaged file.

In the present embodiment, based on the installation file acquired in the step 402, the electronic device may install the installation file on the pre-created virtual host to generate the to-be-imaged file. Refer to the step 203 shown in FIG. 2 for more details.

Step 404, selecting a custom file matching the configuration information from a pre-stored custom file set.

In the present embodiment, by use of the configuration information in the step 401, the electronic device may select a custom file matching the configuration information from a pre-stored custom file set, wherein the custom file contains data required to modify the content of the file.

Step 405, updating the to-be-imaged file based on the custom file matching the configuration information to generate the image file.

In the present embodiment, based on the custom file matching the configuration information, selected in the step 404, the electronic equipment may update the content of the to-be-imaged file on the virtual host to generate the image file according to the data in the custom file.

Step 406, testing the image file.

In the present embodiment, the electronic device can test basic functions and operational stability of the image file according to a stored test program, such as a smoke test. The step 407 may be executed if the testing is passed. The step 408 may be executed if the testing is not passed.

Step 407, designating the image file as a target image file if the testing is passed.

In the present embodiment, the electronic device may designate the image file as the target image file if the testing is passed. In addition, the electronic equipment may monitor the use of target image file, and regularly clean those target image files which are not used at a preset time interval to guarantee enough storage space to generate the image file.

Step 408, acquiring a modified custom file matching the configuration information if the testing is not passed.

In the present embodiment, the electronic device may select the custom file matching the configuration information from the custom file set again in real time or at regular intervals if the testing is passed, and compares the re-selected custom file with the previously selected custom file. If there is a difference, the re-selected custom file is designated as a modified custom file matching the configuration information.

Step 409, updating the to-be-imaged file based on the modified custom file matching the configuration information to generate the image file.

In the present embodiment, the details of the step 409 may be seen by referring to the step 405 and will not be repeated herein.

In some optional implementation modes of the present embodiment, the step 409 may further be implemented through the following steps:

updating the image custom file according to the modified custom file matching the configuration information;

updating the to-be-imaged file based on the updated image custom file to generate the image file; and clearing history record information on the virtual host.

It should be noted that in some application scenarios, an image custom file may be updated using a Git warehouse management technology. As an example, a warehouse is created through a "git init" command; when the electronic device acquires the modified custom file matching the configuration information, the updating of a matched custom file can be viewed and discovered through a "git status" command; then, the custom file is put in a temporary storage area of the warehouse by using a "git add." command; and the custom file (i.e., an updated image custom file) in the temporary storage area is put into the warehouse through a "git commit -m" command. Therefore, the traceability management of updating is easy to carry out.

As can be seen from FIG. 4, the process 400 of the method for generating the image file in the present embodiment, compared with the embodiment corresponding to FIG. 2, highlights the step of testing the image file. Thus, more test contents may be introduced into the scheme described in the present embodiment to achieve a more perfect generation process of the mirror file and a more effective image file.

Figure 5:
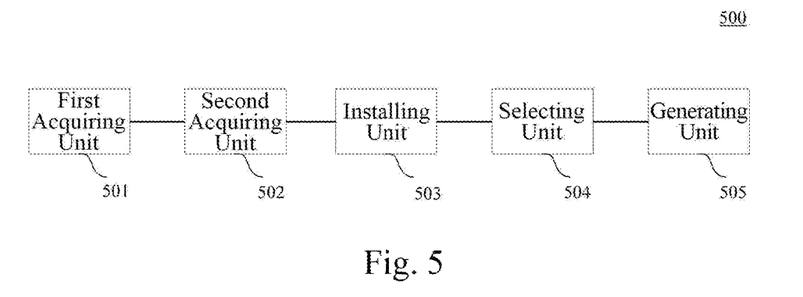
FIG. 5 is a structure diagram of one embodiment of the device for generating the image file according to the present application.

Further refer to FIG. 5, as an implementation of the method shown by the abovementioned figures, the present application provides an embodiment of the device for generating the image file, the device embodiment corresponds to the method embodiment shown in FIG. 2, and the device specifically may be applied to various types of electronic devices.

As shown in FIG. 5, the device 500 for generating the image file, provided by the present embodiment, comprises: a first acquiring unit 501, a second acquiring unit 502, an installing unit 503, a selecting unit 504 and a generating unit 505. Wherein, the first acquiring unit 501 is configured for acquiring demand information for generating an image file, wherein the demand information comprises identification information of a to-be-imaged file and configuration information corresponding to the to-be-imaged file; the second acquiring unit 502 is configured for acquiring an installation file of the to-be-imaged file according to the identification information; the installing unit 503 is configured for installing the installation file on a pre-created virtual host to generate the to-be-imaged file; the selecting unit 504 is configured for selecting a custom file matching the configuration information from a pre-stored custom file set, wherein the custom file contains data required to modify the content of the file; and the generating unit 505 is configured for updating the to-be-imaged file based on the custom file matching the configuration information to generate the image file.

In some optional implementation modes of the present embodiment, the generating unit 505 is further configured for: copying the custom file matching the configuration information to the virtual host to generate an image custom file; updating the to-be-imaged file based on the image custom file to generate the image file; and clearing history record information on the virtual host.

In some optional implementation modes of the present embodiment, the device further comprises a testing unit, which is configured for testing the image file, and designating the image file as a target image file, if the testing is passed.

In some optional implementation modes of the present embodiment, the selecting unit 504 is further configured for: acquiring a modified custom file matching the configuration information if the testing is not passed; and the generating unit 505 is further configured for updating the to-be-imaged file based on the modified custom file matching the configuration information to generate the image file.

In some optional implementation modes of the present embodiment, the generating unit 505 is further configured for: updating the image custom file according to the modified custom file matching the configuration information; updating the to-be-imaged file based on the updated image custom file to generate the image file; and clearing history record information on the virtual host.

In some optional implementation modes of the present embodiment, the installation file comprises an installation package of the to-be-imaged file and a response file corresponding to the installation package, wherein the response file comprises setup parameters required to install the installation package.

In some optional implementation modes of the present embodiment, the installing unit 503 is further configured for: installing the installation package on the pre-created virtual host based on the response file to generate the to-be-imaged file.

In some optional implementation modes of the present embodiment, the custom file comprises at least one of: a script program, a binary program, an installation file of application software, and an auxiliary file containing data required to install the application software.

Hereinafter, refer to FIG. 6, which shows a structure diagram of the computer system 600 of the server applicable to implementation of the embodiments of the present application. The server shown in FIG. 6 is only an example and should not impose any restrictions on the function and scope of application of the embodiments of the present application.

Figure 6:
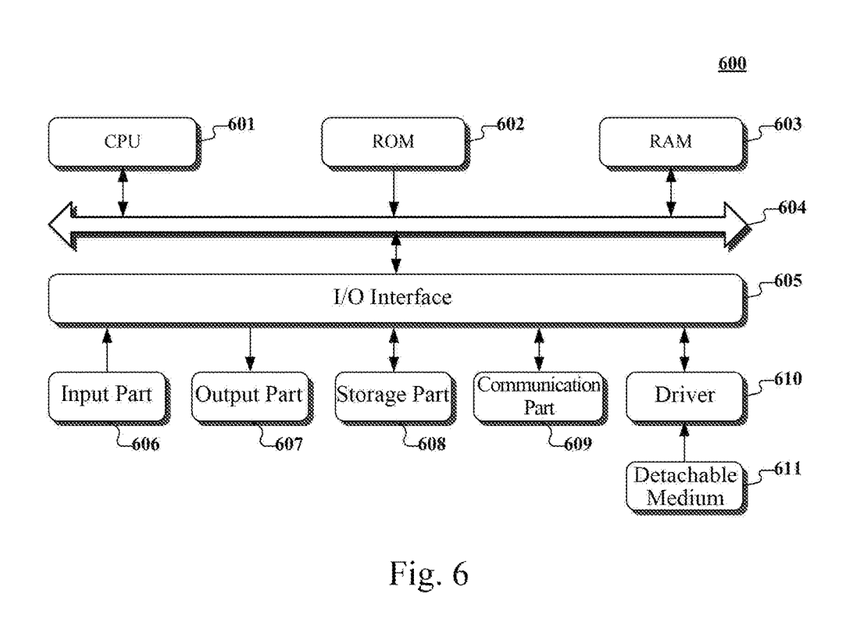
FIG. 6 is a structure diagram of a computer system of a server suitable for implementing the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first acquiring unit, a second acquiring unit, an installing unit, a selecting unit and a generating unit, where the names of these units or modules are not considered as a limitation to the units or modules. For example, the first acquiring unit may also be described as "acquiring demand information for generating an image file."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquiring demand information for generating the image file, wherein the demand information comprises identification information of a to-be-imaged file and configuration information corresponding to the to-be-imaged file; acquiring an installation file of the to-be-imaged file according to the identification information; installing the installation file on a pre-created virtual host to generate the to-be-imaged file; selecting a custom file matching the configuration information from a pre-stored custom file set; and updating the to-be-imaged file based on the custom file matching the configuration information to generate the image file.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for generating an image file, the method comprising:
    acquiring demand information for generating the image file, wherein the demand information comprises identification information of a to-be-imaged file and configuration information corresponding to the to-be-imaged file;
    acquiring an installation file of the to-be-imaged file according to the identification information;
    installing the installation file on a pre-created virtual host to generate the to-be-imaged file;
    selecting a custom file matching the configuration information from a pre-stored custom file set; and
    updating the to-be-imaged file based on the custom file matching the configuration information to generate the image file.

2. The method according to claim 1, wherein the updating the to-be-imaged file based on the custom file matching the configuration information to generate the image file comprises:
    copying the custom file matching the configuration information to the virtual host to generate an image custom file;
    updating the to-be-imaged file based on the image custom file to generate the image file; and
    clearing history record information on the virtual host.

3. The method according to claim 1, further comprising:
    testing the image file, and designating the image file as a target image file, if the testing is passed.

4. The method according to claim 3, further comprising:
    acquiring a modified custom file matching the configuration information if the testing is not passed; and
    updating the to-be-imaged file based on the modified custom file matching the configuration information to generate the image file.

5. The method according to claim 4, wherein the updating the to-be-imaged file based on the modified custom file matching the configuration information to generate the image file comprises:
    updating the image custom file according to the modified custom file matching the configuration information;
    updating the to-be-imaged file based on the updated image custom file to generate the image file; and
    clearing history record information on the virtual host.

6. The method according to claim 1, wherein the installation file comprises an installation package of the to-be-imaged file and a response file corresponding to the installation package, wherein the response file comprises setup parameters required to install the installation package.

7. The method according to claim 6, wherein the installing the installation file on a pre-created virtual host to generate the to-be-imaged file comprises:
    installing the installation package on the pre-created virtual host based on the response file to generate the to-be-imaged file.

8. The method according to claim 1, wherein the custom file comprises at least one of:
    a script program, a binary program, an installation file of application software, and an auxiliary file containing data required to install the application software.

9. A device for generating an image file, the device comprising:
    at least one processor; and
    a memory storing instructions, which when executed by the at least one processor, cause the at least one processor to perform operations, the operations comprising:
    acquiring demand information for generating an image file, wherein the demand information comprises identification information of a to-be-imaged file and configuration information corresponding to the to-be-imaged file;
    acquiring an installation file of the to-be-imaged file according to the identification information;
    installing the installation file on a pre-created virtual host to generate the to-be-imaged file;
    selecting a custom file matching the configuration information from a pre-stored custom file set, wherein the custom file contains data required to modify the content of the file; and updating the to-be-imaged file based on the custom file matching the configuration information to generate the image file.

10. The device according to claim 9, the operations further comprising:
   testing the image file, and designating the image file as a target image file, if the testing is passed.

11. The device according to claim 10, the operations further comprising:
   acquiring a modified custom file matching the configuration information if the testing is not passed; and
   updating the to-be-imaged file based on the modified custom file matching the configuration information to generate the image file.

12. A non-transitory computer readable storage medium, on which computer programs are stored, which when executed by one or more processors, cause the one or more processors to perform operations, the operations comprising:
   acquiring demand information for generating the image file, wherein the demand information comprises identification information of a to-be-imaged file and configuration information corresponding to the to-be-imaged file;
   acquiring an installation file of the to-be-imaged file according to the identification information;
   installing the installation file on a pre-created virtual host to generate the to-be-imaged file;
   selecting a custom file matching the configuration information from a pre-stored custom file set; and
   updating the to-be-imaged file based on the custom file matching the configuration information to generate the image file.

* * * * *